(12) United States Patent
Araki et al.

(10) Patent No.: US 6,628,065 B2
(45) Date of Patent: Sep. 30, 2003

(54) ANTI-REFLECTION MEMBER AND CATHODE RAY TUBE

(75) Inventors: Soya Araki, Aichi (JP); Takao Sumida, Aichi (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/981,909

(22) Filed: Oct. 19, 2001

(65) Prior Publication Data

US 2002/0047509 A1 Apr. 25, 2002

(30) Foreign Application Priority Data

Oct. 20, 2000 (JP) ........................................ 2000-320685

(51) Int. Cl.⁷ ................................................ H01J 31/00
(52) U.S. Cl. ........................................ 313/479; 313/112
(58) Field of Search ................................ 313/478, 479, 313/112, 313

(56) References Cited

FOREIGN PATENT DOCUMENTS

JP           9-156964           6/1997

*Primary Examiner*—Vip Patel
(74) *Attorney, Agent, or Firm*—Rader, Fishman & Grauer PLLC; Ronald P. Kananen, Esq.

(57) ABSTRACT

The present invention relates to an anti-reflection member and a display. The anti-reflection member includes a light transmittable substrate and an anti-reflection film. The anti-reflection film includes a first film formed from a light transmittable material, a second film formed from a light absorptive material having an electrical conductivity, a third film formed from a light transmittable material, a fourth film formed from a light transmittable material having an electrical conductivity, a fifth film formed from a light transmittable material having a high refractive index, and a sixth film formed from a light transmittable material. The anti-reflection member can prevent reflection of not only light coming from the first film side but also light coming from the sixth film side, thereby preventing an image from being doubly displayed on a screen.

12 Claims, 6 Drawing Sheets

ANTI-REFLECTION MEMBER AND CATHODE RAY TUBE

BACKGROUND OF THE INVENTION

The present invention relates to an anti-reflection member including a light transmittable substrate and an anti-reflection film, and, particularly, to an antireflection member suitable for a cathode ray tube.

Anti-reflection members applied to front panels of display apparatuses or the like have been required to have electrically conductive and light absorptive characteristics for improving the contrasts of display images and the ergonomics of users.

On the other hand, along with the recent tendency to flatten panel glass portions of cathode ray tubes, a thickness of each corner portion of the panel glass portion has come to be increased, with a result that the difference in thickness between the corner portion and a center portion of the panel glass portion has become large. Accordingly, a display apparatus using such a cathode ray tube has an inconvenience that the difference in intensity between the center portion and the corner portion of a screen becomes large.

As electrically conductive and light absorptive anti-reflection members, there have been known those of a type including an anti-reflection film using a transition metal. For example, an anti-reflection film having a multi-layer structure of glass, a film formed from a nitride of a transition metal, and a transparent film has been described in Japanese Patent Laid-open No. Hei 9-156964. Further, an anti-reflection film having a multi-layer structure of glass, a film formed from a nitride of a transition metal, a transparent film, a film formed from a nitride of a transition metal, and a transparent film has been described in Japanese Translations of PCT For Patent No. Hei 6-510328.

These electrically conductive and light absorptive anti-reflection members are intended to realize an antireflection function against light incident from a front surface side of the anti-reflection film. According to these electrically conductive and light absorptive antireflection members, a reflectance of the anti-reflection member against light incident from the front surface side of the anti-reflection film can be reduced to a sufficiently low level from the viewpoint of practical use.

By the way, in a conventional cathode ray tube, a panel glass portion has a transmittance of about 50% at a center portion, and a light absorptive film having an absorption ratio of about 75% is provided on the panel glass portion, so that the total transmittance of the panel glass portion provided with the light absorptive film becomes about 38%, with a result that an image can be displayed on the screen with a good contrast.

In addition, the panel glass portion itself has a light absorptive characteristic.

With respect to a panel glass portion of a cathode ray tube of a type having a curved screen, a corner portion is thicker than a center portion by about 14%, and, accordingly, the transmittance of the corner portion becomes about 92% of that of the center portion.

On the other hand, with respect to a panel glass portion of a cathode ray tube of a type having a flattened screen, a corner portion is much thicker than a center portion by about 33% for the convenience of design of the cathode ray tube. Due to such a difference in thickness between the corner portion and the center portion, the transmittance of the corner portion becomes much smaller than that of the corner portion, more concretely, it becomes about 82% of that of the center portion.

To solve the above problem, for a flattened cathode ray tube, it is required to use a panel glass portion having a high transmittance and to reduce the transmittance of an anti-reflection film. If a flattened cathode ray tube meets these requirements, then the cathode ray tube can improve the transmittance ratio between a center portion and a corner portion of a panel glass portion up to about 95% while keeping the contrast performance of the cathode ray tube. Specifically, for a flattened cathode ray tube, it is required to set the transmittance of a panel glass portion to about 75% and the transmittance of an anti-reflection film to about 50%.

For an anti-reflection film having a multi-layer structure including a light absorptive film, generally, a reflectance on a front surface side of the multi-layer film is quite different from that on a back surface side thereof.

For the electrically conductive and light absorptive anti-reflection members disclosed in the above-described two documents, a reflectance against light incident from a front surface side of the multi-layer film can be made very low; however, a reflectance against light incident from a back surface side of the multi-layer film becomes high. Accordingly, in the case of using such an electrically conductive and light absorptive anti-reflection member as a panel glass portion, light emitted from a phosphor screen side is reflected from an interface between the panel glass portion and the film coated thereon, thereby illuminating the phosphor screen again. As a result, the contrast performance of a display image or the like is significantly degraded, thereby causing the problem that an image is doubly displayed.

To cope with such an inconvenience, an optical filter capable of lowering a reflectance against light incident from a back surface side of a multi-layer film has been provided in "Thin Film Optical Filters", H. A. Macleod, McGRAW-HILL, $2^{nd}$ Ed. pp. 65–66 (1989). For such an optical filter, however, the reflectance against light emitted from the front surface side of the multi-layer film is only about 10% in a visible light region, and, therefore, it fails to obtain a practical anti-reflection characteristic.

OBJECT AND SUMMARY OF THE INVENTION

An object of the present invention is to provide an anti-reflection member which has an electrical conductivity and a light absorptivity, and which is capable of not only reducing a reflectance against light incident from a front surface side of an anti-reflection film but also sufficiently reducing a reflectance against light incident from a back surface side of the antireflection film.

To achieve the above object, according to an aspect of the present invention, there is provided an antireflection member including a light transmittable substrate and an anti-reflection film formed on the light transmittable substrate, the anti-reflection film including: a first film formed from a light transmittable material on a principal plane of the light transmittable substrate, the first film having a thickness set in a range of 70 nm or less; a second film formed from a light absorptive material having an electrical conductivity on the first film, the second film having a thickness set in a range of 30 nm or less in accordance with the specific transmittance of the anti-reflection film; a third film formed from a light transmittable material on the second film, the third film having an optical thickness in a range of about an ¼-wavelength to an ⅛-wavelength; a fourth film formed from a light absorptive material having an electrical conductivity on the third film, the fourth film having a thickness set in a range of 30 nm or less in accordance with the specific transmittance of the anti-reflection film; a fifth film formed from a light transmittable material having a high refractive index on the fourth film; and a sixth film formed from a light transmittable material on the fifth film, the sixth film having a refractive index smaller than that of each of the third film and the fifth film and also having an optical thickness which is about an ¼-wavelength when the wavelength of incident light is about 550 nm.

According to the anti-reflection member having the above configuration, since each of the second film and the fourth film constituting part of the anti-reflection film is made from a light absorptive material having an electrical conductivity, an electrical conductivity is given to the entire anti-reflection film by the second and fourth films.

A transmittance of the anti-reflection film can be changed in a wide range by adjusting the thicknesses of the second film and the fourth film in correlation with each other.

Not only reflection of light incident from a front surface side of the anti-reflection film side, that is, the sixth film side, but also reflection of light incident from a back surface side of the anti-reflection film, that is, the light transmittable substrate, side can be sufficiently prevented.

Further, since the fifth film and the sixth films are formed from materials different from each other in refractive index, the transmittance characteristic of the anti-reflection member can be controlled by suitably adjusting the thicknesses of the fifth and sixth films.

A cathode ray tube having a panel portion provided with such an anti-reflection member can desirably keep the contrast performance of display images.

DETAILED DESCRIPTION OF A PREFERRED EMBODIMENT

Hereinafter, a preferred embodiment in which the present invention is applied to a cathode ray tube will be described in detail with reference to the accompanying drawings.

Figure 1:
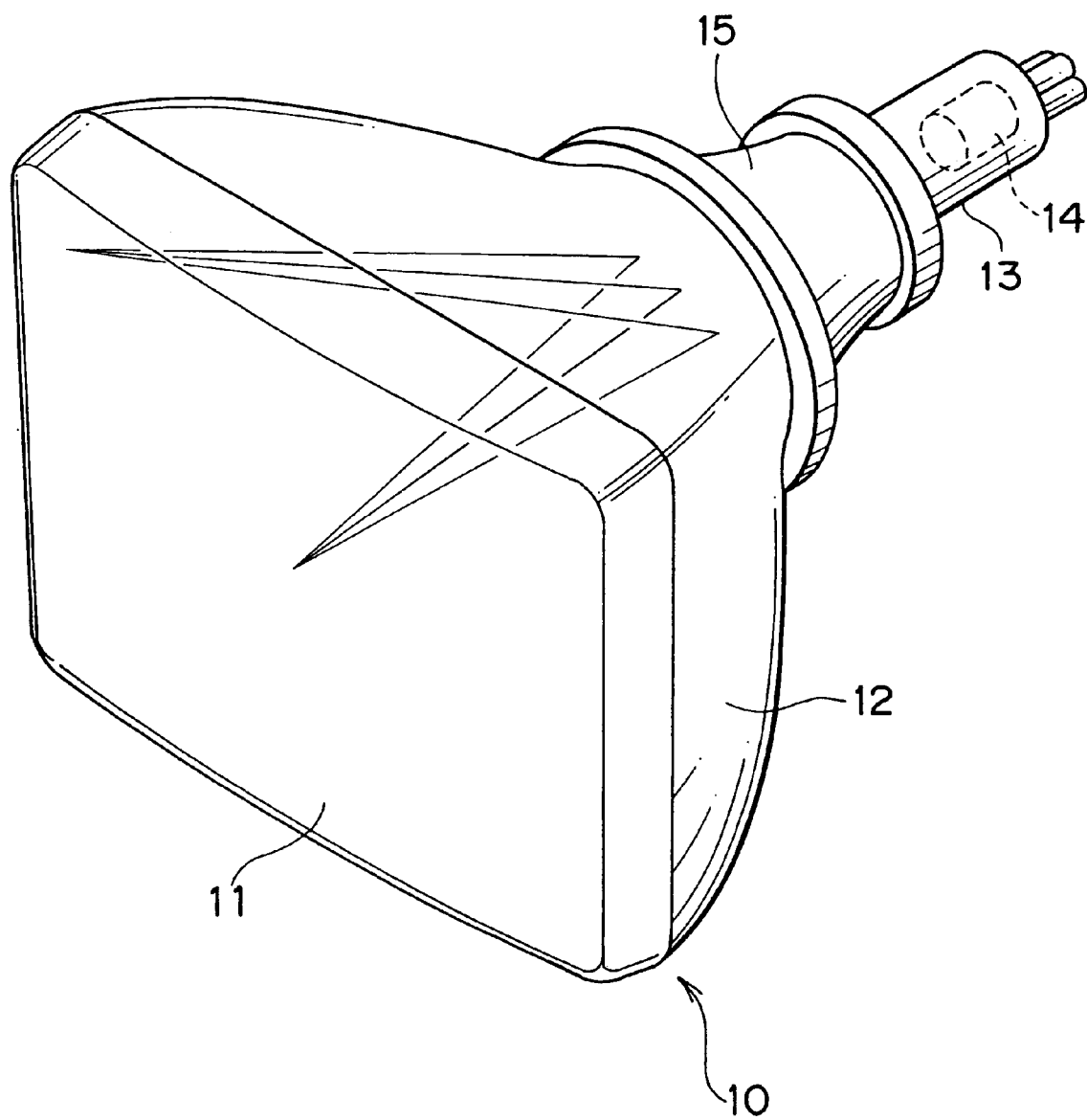
FIG. 1 is a schematic perspective view showing an entire configuration of a cathode ray tube to which the present invention is applied.

FIG. 1 is a schematic perspective view showing an entire configuration of a cathode ray tube to which the present invention is applied.

Referring to FIG. 1, a main body of a cathode ray tube 10 includes a panel portion 11, a funnel portion 12, and a neck portion 13.

A phosphor screen composed of red, green and blue phosphors arrayed in a specific pattern is provided on an inner surface of the panel portion 11. An electron gun 14 as an emission source of electron beams is provided in the neck portion 13. A deflection yoke 15 is mounted to a cone portion extending from the funnel portion 12 to the neck portion 13. An electron beam is scanned in the vertical and horizontal directions by the deflection yoke 15.

Figure 2:
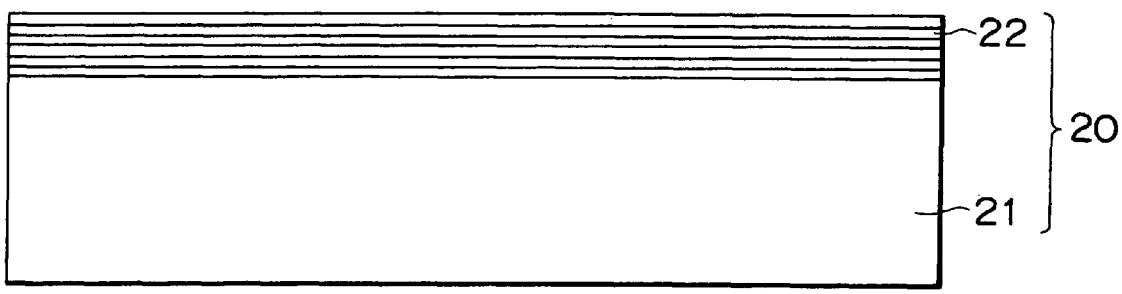
FIG. 2 is a sectional view of an anti-reflection member according to an embodiment of the present invention.
Figure 3:
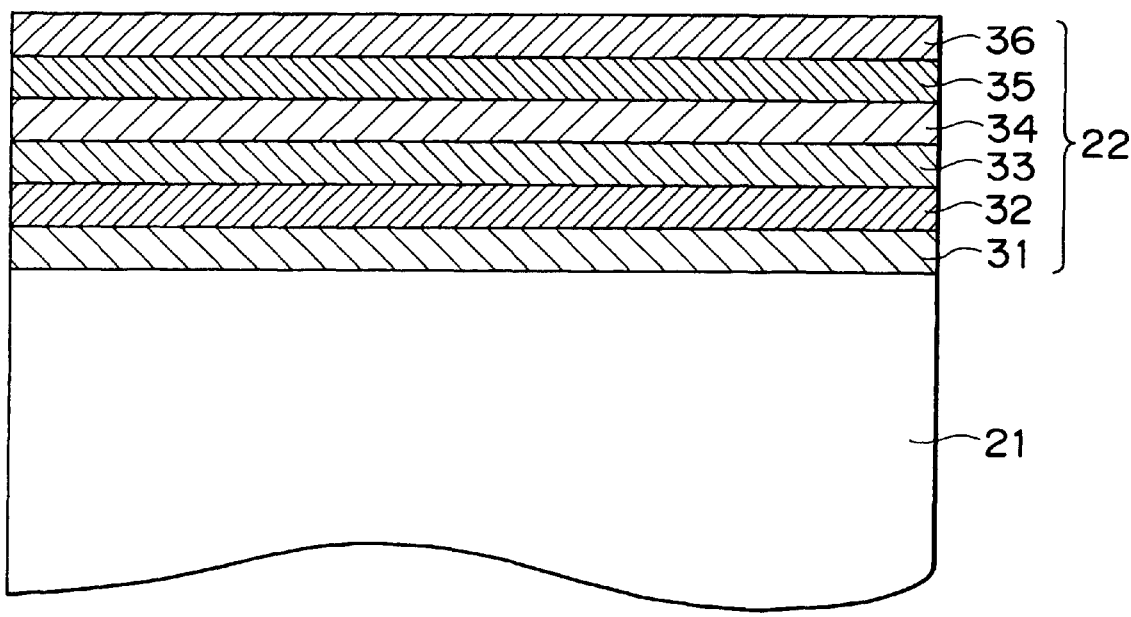
FIG. 3 is an enlarged sectional view of an essential portion of the anti-reflection member according to the embodiment of the present invention.

FIG. 2 is a sectional view of an anti-reflection member constituting a panel front surface portion of the panel portion 11 of the cathode ray tube 10: and, FIG. 3 is an enlarged sectional view of an essential portion shown in FIG. 2.

Referring to FIGS. 2 and 3, there is shown an antireflection member 20, which includes a light transmittable substrate 21 formed from transparent panel glass and an anti-reflection film 22 having a six-layer structure formed on the light transmittable substrate 21.

The anti-reflection film 22 is formed on the light transmittable substrate 21, for example, by a sputtering process, a vacuum deposition process, a chemical vapor deposition (CVD) process, or a sol-gel process. In particular, the use of a DC sputtering process for forming the anti-reflection film 22 is advantageous in that the thickness of the film can be relatively easily controlled, the film can be easily formed on a substrate having a large area, and the film of a multi-layer structure can be easily formed by using an in-line type, DC sputtering system. The film formation process for producing the anti-reflection member of the present invention, however, is not limited thereto.

The anti-reflection film 22 includes a first film 31 formed on a principal plane of the light transmittable substrate 21, a second film 32 formed on the first film 31, a third film 33 formed on the second film 32, a fourth film 34 formed on the third film 33, a fifth film 35 formed on the fourth film 34, and a sixth film 36 formed on the fifth film 35.

The first film 31 is formed from a light transmittable material being transparent in a visible light region. A thickness of the first film 31 is set to 70 nm or less. Specific examples of the light transmittable materials for forming the first film 31 may include silicon nitride ($Si_3N_4$, SiN), indium tin oxide(ITO), and tin dioxide ($SnO_2$).

The second film 32 is formed from a light absorptive material having an electrical conductivity. The thickness of the second film 32 is adjusted in correlation with the thickness of the fourth film 34 to be described later.

By adjusting the film thickness of each of the second film 32 and the fourth film 34 in a range of 30 nm or less in correlation with each other, the transmittance of the entire anti-reflection film 22 can be changed in a range of 20 to 80%. To be more specific, the thickness of each of the second film 32 and the fourth film 34 is set to 30 nm or less under the condition that the reflectance of the anti-reflection member 20 is minimized when the transmittance thereof is about 50%.

Specific examples of the light absorptive materials for forming the second film 32 may include metal nitrides such as titanium nitride (TiN), and metal oxides, such as nickel vanadium oxide (NiVOx).

An electrical conductivity is given to the entire anti-reflection film 22 by the electrically conductive characteristics of the second film 32 and the fourth film 34. As a result, the anti-reflection film 22 can exhibit an antistatic characteristic and an anti-leakage field characteristic.

To be more specific, the sheet resistance of the front surface of the anti-reflection film 22 of the antireflection member 20 may be in a range of 1 KΩ/□ or less, preferably, 500 Ω/□ or less. In this case, the anti-reflection member 20 can exhibit sufficient antistatic and anti-leakage field characteristics.

The third film 33 is formed from a light transmittable material, for example, $Si_3N_4$, SiN, ITO, or $SnO_2$, like the first film 31.

The thickness of the third film 33 is set to an optical thickness in a range of about an ¼-wavelength to a ⅛-wavelength while keeping a trade-off relationship with the fifth film 35 to be described later.

The fourth film 34 is formed from a light absorptive material having an electrical conductivity, for example, a metal nitride, such as TiN, or a metal oxide such as NiVOx, like the second film 32. The thickness of the fourth film 34 is set, as described above, in the range of 30 nm or less in accordance with the above-described specific transmittance of the anti-reflection film 22.

The transmittance distribution of the anti-reflection film 22 can be adjusted by making the material for forming the second film 32 different from the material for forming the fourth film 34. For example, a red-colored, light transmittable film having a transmittance distribution in which the transmittance of light in the wavelength range of 550 nm or more becomes high can be adopted as the fourth film 34.

The fifth film 35 is formed from a light transmittable material having a refractive index higher than that of the third film 33. The thickness of the fifth film 35 is set under the condition that the anti-reflection characteristic of the anti-reflection member 20 is optimized, that is, the reflectance of the anti-reflection member 20 is minimized when the transmittance thereof is about 50%.

The sixth film 36 is formed from a light transmittable material being transparent in a visible light region and having a refractive index (less than about 1.52) less than that of each of the third film 33 and the fifth film 35. The thickness of the sixth film 36 is set to an optical thickness, which is about an ¼-wavelength when a wavelength of incident light is about 550 nm. At this time, the reflectance against light incident from the sixth film side is suppressed at a value less than 1% in the wavelength region (visible light region) of 450 nm to 650 nm. As a result, the reflection of light incident from a front surface side of the antireflection film 22 is certainly prevented by the sixth film, thereby improving visibility.

In the anti-reflection member 20 configured as described above, since the refractive index of the sixth film 36, which is an optical interface between air and the same is low, light is absorbed by the fourth film 34 and the second film 32. Accordingly, the reflection of light incident from the sixth film 36 side (front surface side of the anti-reflection film 22) is prevented.

Also, in the anti-reflection member 20, since the refractive index of the first film 31, which is an optical interface between the light transmittable substrate 20 and the same is low, light is absorbed by the second film 32 and the fourth film 34. Accordingly, the reflection of light incident from the light transmittable substrate 20 side (back surface side of the anti-reflection film 22) is prevented.

As a result, according to the anti-reflection member 20, the above-described characteristics can be achieved by suitably selecting the material and thickness of each film. To be more specific, the anti-reflection member 20 has electrically conductive characteristics such as an antistatic characteristic and an anti-leakage field characteristic, and if they are used for a panel portion of a flattened cathode ray tube, the anti-reflection member 20 can exhibit a good contrast performance while keeping a good intensity ratio between a corner portion and a center portion of the screen.

Further, by making the refractive index of the material for forming the fifth film 35 different from that of the material for forming the sixth film 36, the transmittance characteristic of the anti-reflection film 22 can be adjusted with the film thicknesses of the films 35 and 36 as a parameter.

According to this embodiment, the use of NiVOx as the material for forming the fourth film 34 exhibits the merits discussed below.

The NiVOx film has a dispersion of an optical constant, the dispersion of which is different from that of the TiN film. To be more specific, the TiN film has a light absorptive characteristic on a long-wavelength region side, whereas the NiVOx film has a flat extinction coefficient (k value), and, accordingly, it has a light absorptive characteristic on a short-wavelength region side.

For this reason, the use of NiVOx as the material for forming the fourth film 34 realizes a transmittance distribution such that the transmittance of red-colored light becomes high.

As a result, since the anti-reflection film 22 functions as a red-colored, light transmissible film, it is possible to improve the intensity of red-colored light in display images or the like.

With respect to the luminous efficiency of a phosphor screen of a cathode ray tube, the luminous efficiency of red having a center peak at 625 nm is lower than the luminous efficiency of green or blue. In particular, for a large-sized cathode ray tube of a 21-inch class, the intensity of light of red is weak. Accordingly, for a red color whose luminous efficiency is low, the current of a cathode for emitting an electron beam for red is made higher than that of a cathode for emitting an electron beam of green or blue. In this case, however, the spot diameters of the three electron beams of red, green and blue become irregular, so that the focus characteristic is degraded.

From this viewpoint, according to this embodiment, since the anti-reflection film functions as a red-colored transmissible film, even if the luminous efficiency of red on the phosphor screen is lower than that of green or blue, the intensities of red, green and blue on an actual display screen can be made uniform. In other words, since the current values of cathodes for emitting electrons beams of red, green and blue can be made uniform, it is possible to improve the focus characteristic.

The present invention will be more fully understood by way of the following example:

An anti-reflection member according to the embodiment of the present invention was produced under the following conditions:

[Material Configuration and Film Thickness]

light transmittable substrate: glass first film: $Si_3N_4$ (thickness: 50 nm)

second film: TiN (thickness: 12 nm)

third film: $SnO_2$ (thickness: 35 nm)

fourth film: NiVOx (thickness: 18 nm)

fifth film: TiO$_2$ (thickness: 10 nm)

sixth film: SiO$_2$ (thickness: 94 nm)

In the above film configuration, the thickness of each film was optimized so that a desired anti-reflection condition is satisfied when the transmittance of the film is about 50%.

[Conditions of Film Formation]

(1) Conditions of Film Formation of First Film (Si$_3$N$_4$ Film)

Film Formation Process: DC reactive sputtering process

Target: silicon

Discharge gas: mixed gas of argon and nitrogen (nitrogen: 30 vol %)

Sputter gas pressure: 3×10$^{-3}$ Torr (2) Conditions of Film Formation of Second Film (TiN Film)

Film Formation Process: DC reactive sputtering process

Target: titanium

Discharge gas: mixed gas of argon and nitrogen (nitrogen: 30 vol %)

Sputter gas pressure: 3×10$^{-3}$ Torr (3) Conditions of Film Formation of Third Film (SiO$_2$ Film)

Film Formation Process: DC reactive sputtering process

Target: tin

Discharge gas: oxygen

Sputter gas pressure: 3×10$^{-3}$ Torr (4) Conditions of Film Formation of Fourth Film (NiVOx Film)

Film Formation Process: DC reactive sputtering process

Target: nickel-vanadium alloy

Discharge gas: oxygen

Sputter gas pressure: 3×10$^{-3}$ Torr (5) Conditions of Film Formation of Fifth Film (TiO$_2$ Film)

Film Formation Process: DC reactive sputtering process

Target: titanium

Discharge gas: oxygen

Sputter gas pressure: 3×10$^{-3}$ Torr (6) Conditions of Film Formation of Sixth Film (SiO$_2$ Film)

Film Formation Process: DC reactive sputtering process

Target: silicon (doped with 10 wt % of aluminum)

Discharge gas: oxygen

Sputter gas pressure: 3×10$^{-3}$ Torr

Figure 4:
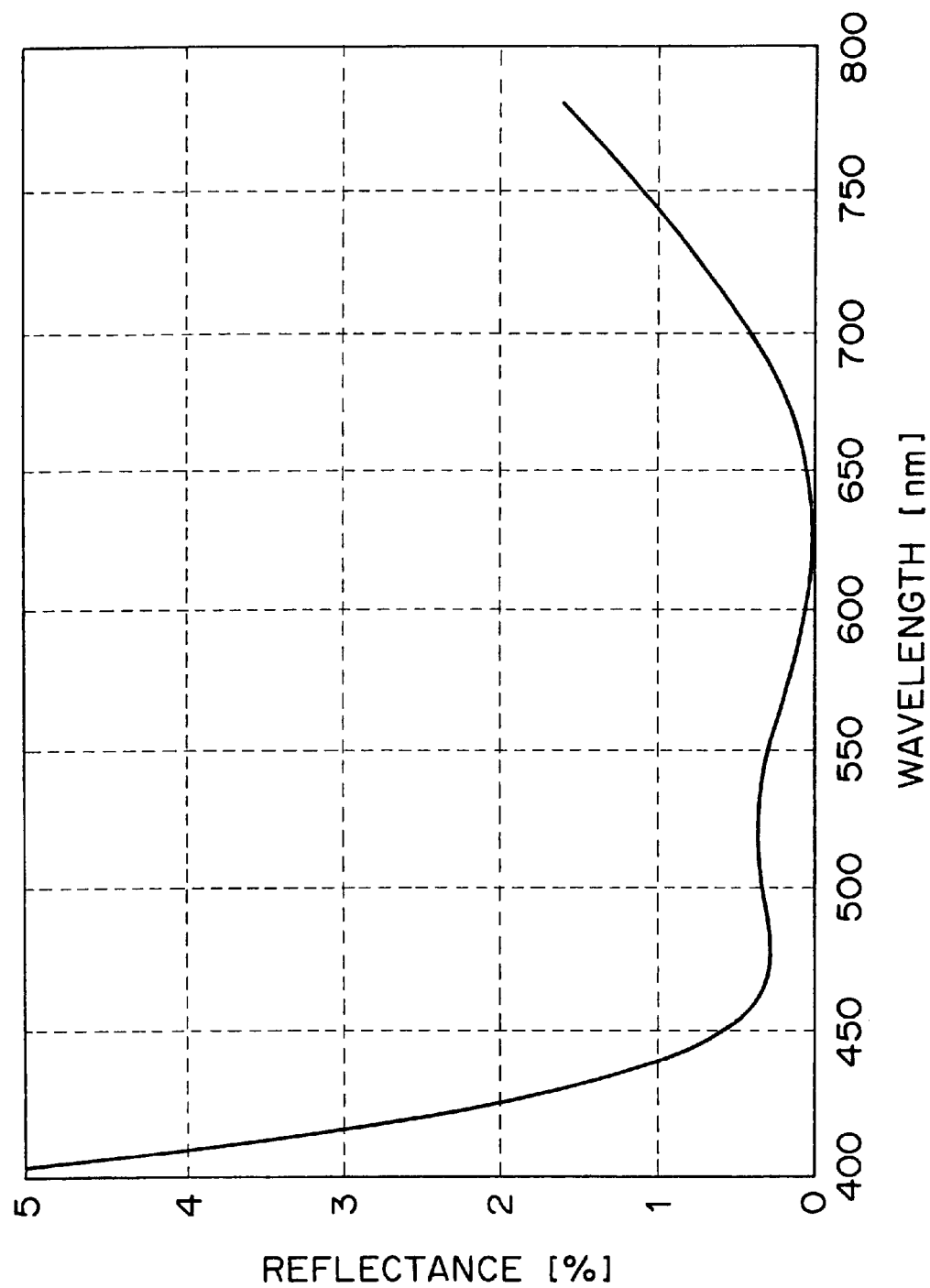
FIG. 4 is a graph showing a reflection characteristic against light incident from a front surface side of an anti-reflection film of the antireflection member according to the embodiment of the present invention.

FIG. 4 is a graph showing a reflectance characteristic against light incident on a front surface side of the anti-reflection film 22, that is, from the sixth film 36 side of the anti-reflection member 20 produced as described above; and, FIG. 5 is a graph showing a reflectance characteristic against light incident on a back surface side of the anti-reflection film 22, that is, from the light transmittable substrate 20 side of the anti-reflection member 20.

As shown in FIG. 4, against light incident on the front surface side, the maximum reflectance in a visible light region of 450 nm to 650 nm is 0.65%, an average reflectance in the above visible light region is 0.23%, and a luminous reflectance in the above visible light region is 0.22%. As a result, it becomes apparent that the anti-reflection film 22 exhibits a good antireflection characteristic against light incident from the front surface side.

Figure 5:
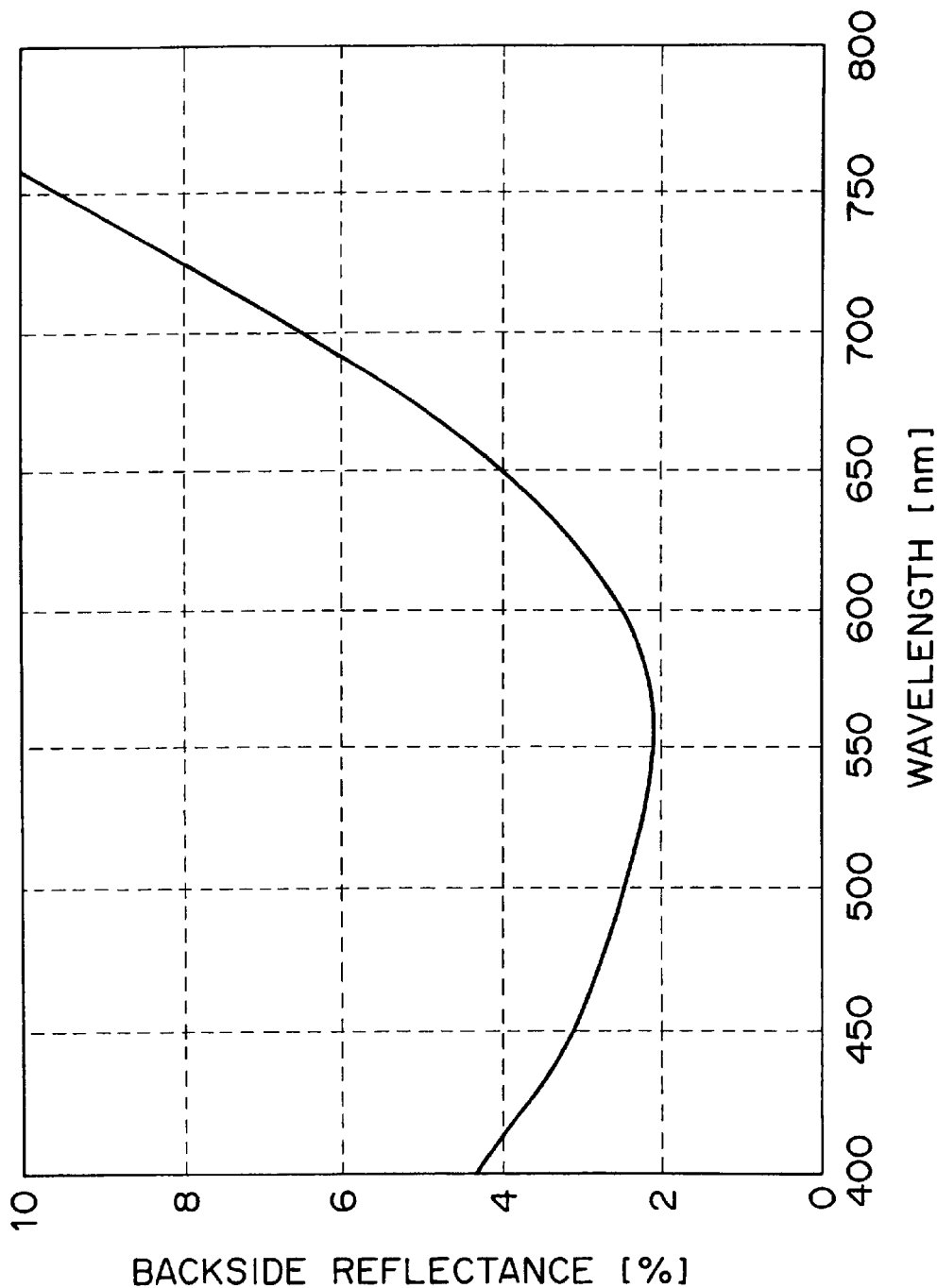
FIG. 5 is a graph showing a reflection characteristic against light incident from a back surface side of the anti-reflection film of the antireflection member according to the embodiment of the present invention.

As shown in FIG. 5, against light incident on the back surface side, the maximum reflectance in a visible light region of 450 nm to 650 nm is 4.0%, an average reflectance in the above visible light region is 2.6%, and a luminous reflectance in the above visible light region is 2.1%. In this way, the reflectance against light from the back surface side is suppressed at a value comparable to the reflectance (about 4%) of a glass surface.

Figure 6:
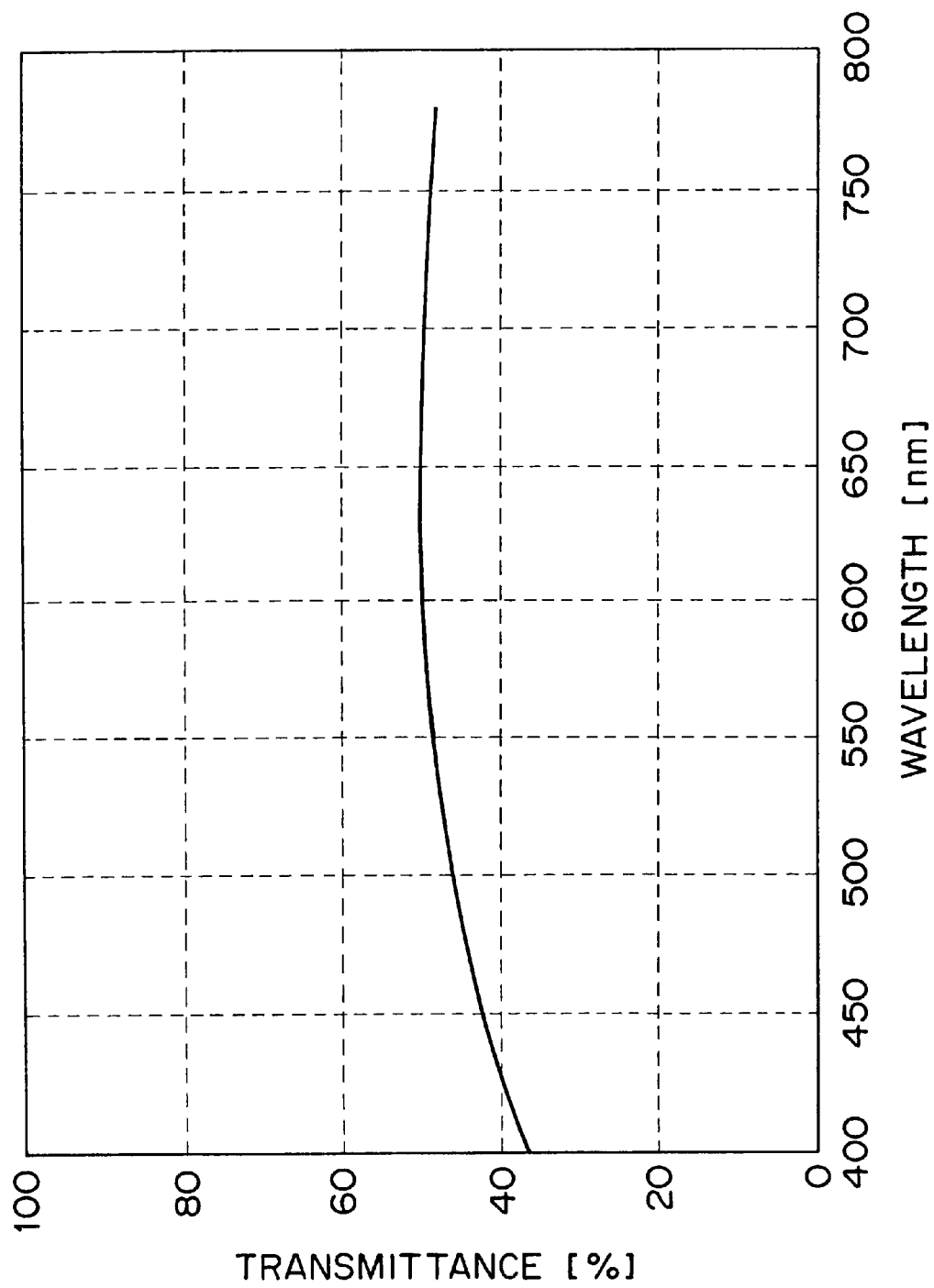
FIG. 6 is a graph showing a transmittance characteristic against light incident from the front surface side of the anti-reflection film of the antireflection member according to the embodiment of the present invention.
Figure 7:
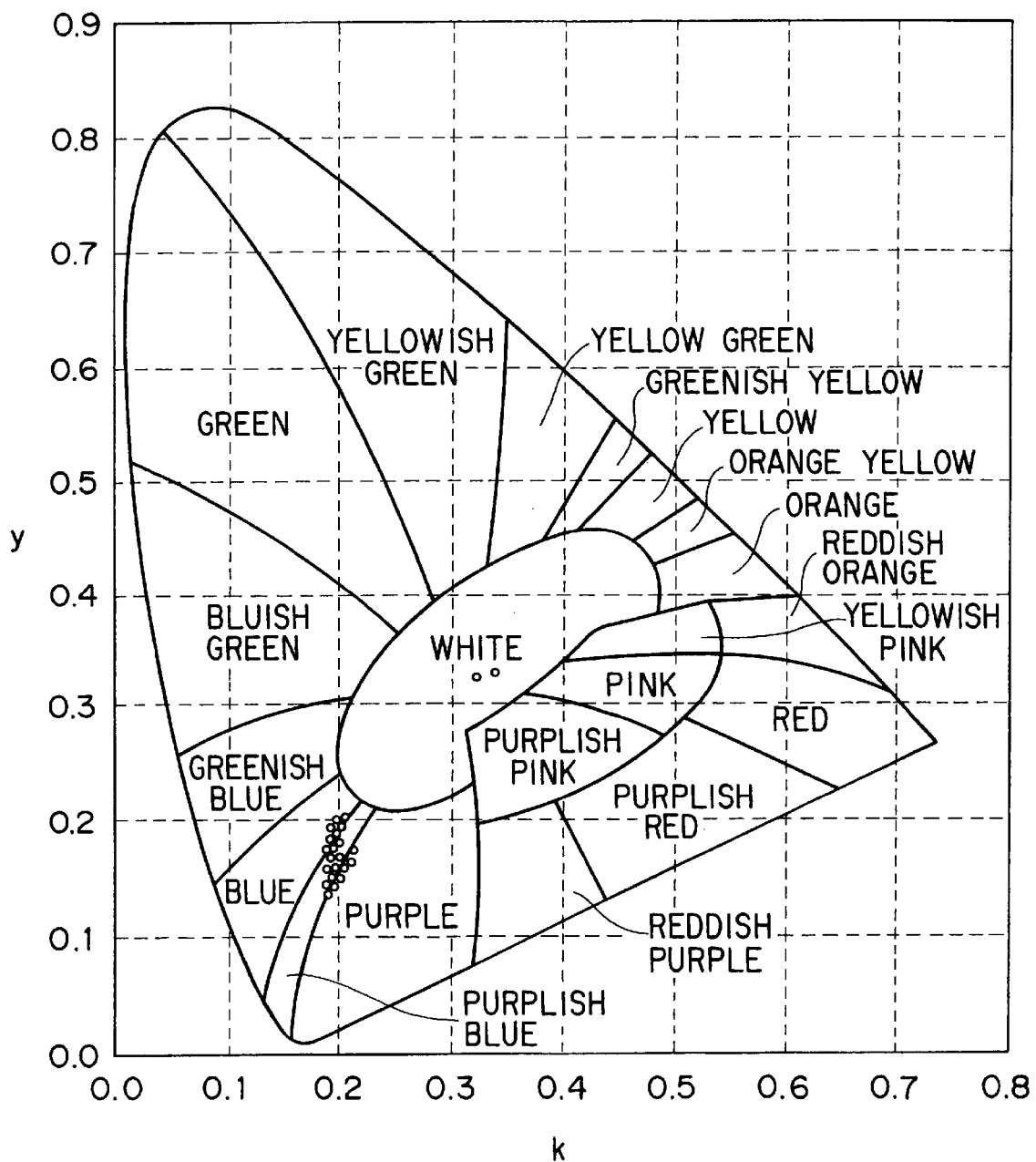
FIG. 7 is a diagram showing a chromaticity distribution of reflected light, which has made incident from the front surface side of the anti-reflection film and reflected therefrom, in the anti-reflection member according to the embodiment of the present invention.

FIG. 6 is a transmittance characteristic against light incident from the front surface side of the anti-reflection film 22 (sixth film 36 side) of the antireflection member 20 produced as described above; and, FIG. 7 is a diagram showing a chromaticity distribution of light having been made incident from the front side of the anti-reflection film 22 and reflected from the antireflection film 22. In addition, FIG. 6 shows the transmittance characteristic of the anti-reflection film 22 formed on a glass plate having no light absorptivity and having a thickness of 1 mm; and, FIG. 7 shows a chromaticity distribution of light reflected from the front surface of the anti-reflection film 22 in which the thickness of each film has a variation of ±2%.

As shown in FIG. 6, an average transmittance in a visible light region becomes 50%. Accordingly, it becomes apparent that the anti-reflection film 22 exhibits a good transmittance characteristic against light incident from the front surface side. Further, as shown in FIG. 7, the chromaticity of light having been made incident from the surface side and reflected therefrom is largely offset to a blue system, so that it becomes apparent that the film functions as a red-colored light transmissible film.

In the above-described embodiment, as the material for forming each film of the anti-reflection film 22, a nitride of a transition metal, such as hafnium or niobium, can be used in place of TiN. Further, as the material for forming the light transmittable substrate 20, a transparent plastic material can be used in place of glass.

While the preferred embodiment of the present invention has been described using the specific terms, such description is for illustrative purposes only, and it is to be understood that changes and variations may be made without departing from the spirit or scope of the following claims.

What is claimed is:

1. An anti-reflection member including a light transmittable substrate and an anti-reflection film formed on said light transmittable substrate, said anti-reflection film comprising:

a first film formed from a light transmittable material on a principal plane of said light transmittable substrate, said first film having a thickness set in a range of 70 nm or less;

a second film formed from a light absorptive material having an electrical conductivity on said first film, said second film having a thickness set in a range of 30 nm or less in accordance with a specific transmittance of said anti-reflection film;

a third film formed from a light transmittable material on said second film, said third film having an optical thickness in a range of about a ¼-wavelength to a ⅛-wavelength;

a fourth film formed from a light absorptive material having an electrical conductivity on said third film, said fourth film having a thickness set in a range of 30 nm or less in accordance with said specific transmittance of said anti-reflection film;

a fifth film formed from a light transmittable material having a high refractive index on said fourth film; and a sixth film formed from a light transmittable material on said fifth film, said sixth film having a refractive index smaller than that of each of said third film and said fifth film and also having an optical thickness which is about a ¼-wavelength when a wavelength of incident light is about 550 nm.

2. An anti-reflection member according to claim 1, wherein said second film is formed from a metal nitride or a metal oxide, said fourth film also is formed from a metal nitride or a metal oxide, and an electrical conductivity is given to said anti-reflection film by said second film and said fourth film.

3. An anti-reflection member according to claim 1, wherein a sheet resistance of said anti-reflection film is in a range of 1 KΩ/□ or less.

4. An anti-reflection member according to claim 1, wherein a transmittance of said anti-reflection film is made variable in a specific range by adjusting the thicknesses of said second film and said fourth film in correlation with each other.

5. An anti-reflection member according to claim 1, wherein said fourth film is a red-colored light transmittable film having a transmittance distribution in which a transmittance of light in a wavelength range of 550 nm or more becomes high.

6. An anti-reflection member according to claim 1, wherein said fourth film is formed from NiVOx.

7. A cathode ray tube having a panel portion provided with an anti-reflection member including a light transmittable substrate and an anti-reflection film formed on said light transmittable substrate, said anti-reflection film comprising:

a first film formed from a light transmittable material on a principal plane of said light transmittable substrate, said first film having a thickness set in a range of 70 nm or less;

a second film formed from a light absorptive material having an electrical conductivity on said first film, said second film having a thickness set in a range of 30 nm or less in accordance with a specific transmittance of said anti-reflection film;

a third film formed from a light transmittable material on said second film, said third film having an optical thickness in a range of about a ¼-wavelength to a ⅛-wavelength;

a fourth film formed from a light absorptive material having an electrical conductivity on said third film, said fourth film having a thickness set in a range of 30 nm or less in accordance with said specific transmittance of said anti-reflection film;

a fifth film formed from a light transmittable material having a high refractive index on said fourth film; and a sixth film formed from a light transmittable material on said fifth film, said sixth film having a refractive index smaller than that of each of said third film and said fifth film and also having an optical thickness which is about a ¼-wavelength when a wavelength of incident light is about 550 nm.

8. A cathode ray tube according to claim 7, wherein said second film is formed from a metal nitride or a metal oxide, said fourth film also is formed from a metal nitride or a metal oxide, and an electrical conductivity is given to said anti-reflection film by said second film and said fourth film.

9. A cathode ray tube according to claim 7, wherein a sheet resistance of said anti-reflection film is in a range of 1 KΩ/□ or less.

10. A cathode ray tube according to claim 7, wherein a transmittance of said anti-reflection film is made variable in a specific range by adjusting the thicknesses of said second film and said fourth film in correlation with each other.

11. A cathode ray tube according to claim 7, wherein said fourth film is a red-colored light transmittable film having a transmittance distribution in which a transmittance of light in a wavelength range of 550 nm or more becomes high.

12. A cathode ray tube according to claim 7, wherein said fourth film is formed from NiVOx.

* * * * *